(12) United States Patent
Yamanaka et al.

(10) Patent No.: US 10,352,450 B2
(45) Date of Patent: Jul. 16, 2019

(54) SEALING DEVICE

(71) Applicant: NOK CORPORATION, Tokyo (JP)

(72) Inventors: Satoshi Yamanaka, Fukushima (JP);
Norimasa Hosonuma, Fujisawa (JP);
Maiko Kawamoto, Fujisawa (JP);
Fangman Xu, Fujisawa (JP)

(73) Assignee: NOK Corporation (JP)

( * ) Notice: Subject to any disclaimer, the term of this patent is extended or adjusted under 35 U.S.C. 154(b) by 270 days.

(21) Appl. No.: 15/317,718

(22) PCT Filed: Jun. 9, 2015

(86) PCT No.: PCT/JP2015/066541
§ 371 (c)(1),
(2) Date: Dec. 9, 2016

(87) PCT Pub. No.: WO2015/190450
PCT Pub. Date: Dec. 17, 2015

(65) Prior Publication Data
US 2017/0114901 A1    Apr. 27, 2017

Related U.S. Application Data

(63) Continuation of application No. PCT/JP2015/066541, filed on Jun. 9, 2015.

(30) Foreign Application Priority Data

Jun. 10, 2014  (JP) .................................. 2014-119271
Jun. 10, 2014  (JP) .................................. 2014-119273
(Continued)

(51) Int. Cl.
F16J 15/32    (2016.01)
F16J 15/3204    (2016.01)
(Continued)

(52) U.S. Cl.
CPC .......... F16J 15/3204 (2013.01); F16J 15/164 (2013.01); F16J 15/32 (2013.01);
(Continued)

(58) Field of Classification Search
CPC ...... F16J 15/16; F16J 15/3204; F16J 15/3216; F16J 15/322; F16J 15/3232; F16J 15/324;
(Continued)

(56) References Cited

U.S. PATENT DOCUMENTS 3,664,675 A    5/1972   Malmstrom
3,785,660 A    1/1974   Bush
(Continued)

FOREIGN PATENT DOCUMENTS

CN    1934379 A    3/2007
CN    200940684 Y    8/2007
(Continued)

OTHER PUBLICATIONS

Extended European Search Report for Patent Application No. EP17192821.1 dated Feb. 13, 2018 (7 pages).
(Continued)

*Primary Examiner* — Vishal A Patel
(74) *Attorney, Agent, or Firm* — Harness, Dickey & Pierce, P.L.C.

(57) ABSTRACT

The invention provides a sealing device sealing so as to prevent a sealed fluid in a machine inner side from leaking to a machine outer side between a housing and a rotating shaft which is inserted to a shaft hole provided in the housing. The sealing device has a seal flange which is installed to an outer periphery of the rotating shaft, and a seal lip which is installed to an inner periphery of the shaft hole of the housing and slidably comes into contact with the seal flange over an entire periphery. The sealing device includes a thread groove which exerts a fluid pumping action when
(Continued)

the rotating shaft rotates. The thread groove is provided at a position which does not intersect a contact area where the seal lip slidably comes into contact with the seal flange over the entire periphery, thereby suppressing generation of static leakage.

2 Claims, 11 Drawing Sheets

(30) Foreign Application Priority Data

Jun. 10, 2014 (JP) ................................ 2014-119275
Jul. 8, 2014 (JP) ................................ 2014-140118

(51) Int. Cl.
| | | |
|---|---|---|
| F16J 15/3244 | (2016.01) | |
| F16J 15/16 | (2006.01) | |
| F16J 15/3256 | (2016.01) | |
| F16J 15/3264 | (2016.01) | |
| F16J 15/34 | (2006.01) | |

(52) U.S. Cl.
CPC ....... *F16J 15/3244* (2013.01); *F16J 15/3256* (2013.01); *F16J 15/3264* (2013.01); *F16J 15/3456* (2013.01)

(58) Field of Classification Search
CPC ...... F16J 15/3244; F16J 15/15; F16J 15/3248; F16J 15/3252; F16J 15/3256; F16J 15/3268; F16J 15/447
See application file for complete search history.

(56) References Cited

U.S. PATENT DOCUMENTS

| | | | |
|---|---|---|---|
| 3,790,180 | A | 2/1974 | Heyn et al. |
| 4,689,190 | A | 8/1987 | Peisker et al. |
| 4,906,009 | A | 3/1990 | Saitoh |
| 4,928,979 | A | 5/1990 | Nagasawa |
| 5,201,529 | A * | 4/1993 | Heinzen ............... F16J 15/3256 277/351 |
| 5,553,870 | A | 9/1996 | Czekansky et al. |
| 6,273,428 | B1 | 8/2001 | Sassi |
| 6,729,624 | B1 | 5/2004 | Johnston |
| 6,789,805 | B2 | 9/2004 | Sassi |
| 7,523,945 | B2 | 4/2009 | Kanda |
| 7,674,044 | B2 * | 3/2010 | Matsui ............... F16O 33/7876 384/480 |
| 2007/0063450 | A1 | 3/2007 | Krulis et al. |
| 2007/0187901 | A1 | 8/2007 | Matsui |
| 2009/0036006 | A1 | 2/2009 | Kishimoto et al. |
| 2010/0194054 | A1 * | 8/2010 | Nishigaki ............ F16J 15/3256 277/549 |
| 2011/0006485 | A1 * | 1/2011 | Nakagawa ............ F16J 15/164 277/549 |
| 2011/0095486 | A1 | 4/2011 | Nakagawa |
| 2011/0193294 | A1 * | 8/2011 | Munekata ............ F16J 15/164 277/423 |
| 2015/0276059 | A1 | 10/2015 | Nakagawa |
| 2015/0285379 | A1 * | 10/2015 | Matsui ............... F16J 15/3264 277/351 |
| 2015/0285380 | A1 | 10/2015 | Nakagawa |
| 2017/0122438 | A1 * | 5/2017 | Hamamoto ............ F16J 15/32 |

FOREIGN PATENT DOCUMENTS

| | | |
|---|---|---|
| CN | 200989444 Y | 12/2007 |
| CN | 101189461 A | 5/2008 |
| CN | 201553605 U | 7/2010 |
| CN | 201954002 U | 8/2011 |
| CN | 202301953 U | 7/2012 |
| CN | 203051779 U | 7/2013 |
| CN | 103542097 A | 1/2014 |
| DE | 10334896 A1 | 3/2005 |
| EP | 1586799 A1 | 10/2005 |
| EP | 2749796 A1 | 7/2014 |
| JP | S57-117460 U | 7/1982 |
| JP | S63-175355 U | 11/1988 |
| JP | H02-113173 A | 4/1990 |
| JP | H03-057563 U | 6/1991 |
| JP | H03-62267 U | 6/1991 |
| JP | H04-27262 U | 3/1992 |
| JP | 2003-287142 A | 10/2003 |
| JP | 2005-273693 A | 10/2005 |
| JP | 2011-117550 A | 6/2011 |
| JP | 2012-172710 A | 9/2012 |
| JP | 2014-070728 A | 4/2014 |
| JP | 2014-084934 A | 5/2014 |
| WO | WO-2014-065013 A1 | 5/2014 |
| WO | WO-2014-065014 A1 | 5/2014 |

OTHER PUBLICATIONS

Extended European Search Report for Patent Application No. EP 15806192.9 dated May 18, 2017 (8 pages).

* cited by examiner

SEALING DEVICE

CROSS-REFERENCE TO RELATED APPLICATIONS

This application is a U.S. National Stage application of International Application No. PCT/JP2015/066541 filed on Jun. 9, 2015, and published in Japanese as WO 2015/190450 A1 on Dec. 17, 2015. This application claims priority to Japanese Application Nos. 2014-119271 filed on Jun. 10, 2014, 2014-119273 filed on Jun. 10, 2014, 2014-119275 filed on Jun. 10, 2014 and 2014-140118 filed on Jul. 8, 2014. The entire disclosures of the above applications are incorporated herein by reference.

BACKGROUND OF THE INVENTION

Field of the Invention

The present invention relates to a sealing device which prevents a fluid to be sealed in an inside of a machine from leaking out to an outside of a machine in a motor vehicle, a general machine and an industrial machine, and is provided with a structure in which a non-rotating seal lip is brought into slidable contact with a seal flange in a rotating side. The sealing device according to the present invention is used, for example, as a rotating oil seal which seals an oil in an inside of a machine in a field associated to the motor vehicle.

Description of the Conventional Art

As shown in FIGS. 13A and 13B, there has been conventionally known a sealing device 101 which seals so as to prevent a sealed fluid (oil) in a machine inner side A leaking out to a machine outer side B between a housing 51 and a rotating shaft 61 passing through a shaft hole 52 provided in the housing 51, the sealing device 101 being constructed by a combination of a slinger 111 which is installed to an outer periphery of a rotating shaft 61, and a lip seal member 121 which is installed to an inner periphery of the shaft hole 52 in the housing 51.

The slinger 111 is made of a rigid material such as a metal, integrally has a sleeve portion 112 which is fixed to an outer peripheral surface of the rotating shaft 61, and a flange portion 113 which is provided in one end of the sleeve portion 112, and is provided in a machine outer side end face 113a of the flange portion 113 with a thread groove 114 exerting a fluid pumping action caused by a centrifugal force when the rotating shaft 61 rotates.

On the other hand, the lip seal member 121 has an attachment ring 122 which is fixed to an inner peripheral surface of the shaft hole 52 in the housing 51, and a rubber-like elastic body 123 which is fitted to the attachment ring 122, and is provided with a seal lip (an end face lip) 124 which slidably comes into close contact with the machine outer side end face 113a of the flange portion 113 in the slinger 111, by the rubber-like elastic body 123.

In recent years, a development of fuel efficient cars has been accelerated in a motor vehicle industry due to an environmental problem, and torque reduction at a time of rotating is listed up as needs for an oil seal for an engine. Under such a condition, according to the sealing device 101 having the end face lip structure shown in FIG. 13, the low torque can be achieved in comparison with a sealing device having a general radial lip structure.

SUMMARY OF THE INVENTION

Problem to be Solved by the Invention

However, further functional improvement has been requested with regard to the following points in the sealing device 101 shown in FIG. 13.

More specifically, in the sealing device 101, since the slinger 111 rotating together with the rotating shaft 61 exerts a fluid shake-off action caused by the flange portion 113 and a fluid pumping action caused by the thread groove 114 when the rotating shaft 61 rotates, it is possible to suppress leakage of the sealed fluid. However, since a centrifugal force disappears when the rotation of the rotating shaft 61 stops, there is a risk that the sealed fluid passes through a leading end of the seal lip 124 along the thread groove 114 and leaks to the machine outer side B (a so-called risk that a static leakage is generated). The static leakage particularly tends to be generated in the case that an incline is generated in a vehicle body, for example, when the motor vehicle stops in the middle of a sloping road, and an oil amount (an oil surface level) within the shaft hole 52 of the engine goes beyond a lower end of the rotating shaft 61.

The present invention is made by taking the above problems into consideration, and an object of the present invention is to provide a sealing device having a seal flange and a seal lip which slidably comes into contact with the seal flange, wherein the sealing device can inhibit the static leakage from being generated when the rotation of the rotating shaft stops.

Means for Solving the Problem

The present invention employs the following means for exerting the above object.

A sealing device according to the present invention is a sealing device sealing so as to prevent a sealed fluid in a machine inner side from leaking to a machine outer side between a housing and a rotating shaft which is inserted to a shaft hole provided in the housing, the sealing device comprising: a seal flange which is installed to an outer periphery of the rotating shaft; a seal lip which is installed to an inner periphery of the shaft hole of the housing; and the seal lip slidably coming into contact with the seal flange over an entire periphery, wherein the sealing device comprises: a thread groove which exerts a fluid pumping action when the rotating shaft rotates, and wherein the thread groove is provided at a position which does not intersect a contact area where the seal lip slidably comes into contact with the seal flange over the entire periphery.

According to the sealing device of the present invention, since the thread groove exerting the fluid pumping action when the rotating shaft rotates is provided at the position which does not intersect the contact area where the seal lip slidably comes into contact with the seal flange over the entire periphery, the thread groove does not form a leakage flow path of a static leakage when the rotating shaft stops. Therefore, it is possible to inhibit the static leakage from being generated through the thread groove.

In the present invention, with regard to the position where the thread groove is provided, and the other structures for enhancing a sealing function, the following aspects can be thought.

First Aspect

A thread groove forming area is provided in a machine outer side end face of the seal flange by setting up the thread groove in a part of the machine outer side end face of the seal flange, and a thread groove non-forming area which is not provided with the thread groove is provided in an outer peripheral side of the thread groove forming area, thereby slidably bringing the seal lip into contact with the thread groove non-forming area. Further, an annular projection is provided in an inner peripheral side of the seal lip toward the seal flange, and a micro gap is provided between the projection and the seal flange.

According to the sealing device of the aspect mentioned above, the thread groove non-forming area is provided in the outer peripheral side of the thread groove forming area in the machine outer side end face of the seal flange, and the seal lip comes into contact with the thread groove non-forming area in the outer peripheral side in place of the thread groove forming area. As a result, a lip end of the seal lip and the thread groove do not intersect each other. Therefore, the thread groove does not form the leakage flow path of the static leakage and it is accordingly possible to inhibit the static leakage from being generated through the thread groove.

Further, when the rotating shaft rotates, in addition to a sealing action exerted by the seal lip, the seal flange exerts a fluid shake-off action in conjunction with rotation, the thread groove exerts a fluid pumping action in conjunction with rotation, and the micro gap further exerts a non-contact labyrinth sealing action. Therefore, it is possible to inhibit the sealed fluid from leaking to the machine outer side on the basis of each of the actions.

Further, in the sealing device according to the first aspect mentioned above, the projection may be structured such that a micro gap is formed between the projection and the thread groove forming area in the machine outer side end face of the seal flange.

According to the structure, since the micro gap is formed between the projection and the thread groove forming area in the machine outer side end face of the seal flange, the thread groove exerts the fluid pumping action according to the rotation in the inner portion of the micro gap, and fluid pumping action covers the entire micro gap width since the micro gap is narrow. Therefore, the sealed fluid passing through the seal lip sliding portion leaks to the machine outer side only after passing through the micro gap, however, the pumping action is necessarily applied to the sealed fluid entering into the micro gap. As a result, the sealed fluid is hard to pass through the micro gap and is accordingly hard to leak to the machine outer side. On the basis of the action mentioned above, the narrower the micro gap width, the better the micro gap function is.

Second Aspect

A thread groove forming area is provided in a machine outer side end face of the seal flange by setting up the thread groove in a part of the machine outer side end face of the seal flange, and a thread groove non-forming area which is not provided with the thread groove is provided in the other portion in a machine outer side end face of a seal flange, thereby slidably bringing the partial seal lip among a plurality of seal lips into contact with the thread groove forming area, and slidably bringing the other seal lip into contact with the thread groove non-forming area.

According to the sealing device of the aspect mentioned above, an excellent sealing performance can be exerted by a thread pumping effect obtained by the thread groove extending in a centripetal direction in relation to a rotating direction, in a sliding portion between the partial seal lip among a plurality of seal lips and the seal flange, when the rotating shaft rotates, and an excellent sealing performance can be maintained by the other seal lip which is brought into close contact with the thread groove non-forming area in the seal flange, when the rotating shaft stops.

Further, in the sealing device according to the second aspect mentioned above, the other seal lip slidably brought into close contact with the thread groove non-forming area may be formed to repel in a lower level than the partial seal lip slidably brought into close contact with the thread groove forming area.

According to the structure, it is possible to inhibit friction caused by a sliding motion with the seal flange at a time of rotating from being increased.

Third Aspect

In this aspect, the shaft hole and the rotating shaft are structured such that their central axes are set toward a horizontal direction. Further, the sealed fluid may be structured such as to be filled to a predetermined height position within the shaft hole when the rotation of the rotating shaft stops. The thread groove is provided on a facing surface of the seal lip which faces to the machine outer side end face of the seal flange, and the thread groove is provided only at a position which is above the predetermined height position to which the sealed fluid is filled within the shaft hole when the rotation of the rotating shaft stops, on the facing surface of the seal lip.

According to the sealing device of the aspect mentioned above, the thread groove exerting the fluid pumping action when the rotating shaft rotates is provided on the facing surface of the seal lip which faces to the machine outer side end face of the seal flange, and the thread groove is provided only at the position which is above the predetermined height position to which the sealed fluid is filled within the shaft hole when the rotation of the rotating shaft stops, on the facing surface of the seal lip. As a result, the thread groove is not provided at a position which is below the predetermined height position. Therefore, there is not generated a state in which the circumferentially partial thread groove 114 is arranged below the liquid surface water level H and is immersed by the sealed fluid, which occurs in the sealing device 101 according to the prior art in FIG. 13. Accordingly, it is possible to effectively suppress generation of the static leakage.

Further, since the thread groove is provided in the seal lip in a stationary side (a non-rotating side) in place of the rotating side, it is possible to effectively suppress the generation of the static leakage.

In the sealing device 101 according to the prior art in FIG. 13, since the thread groove 114 is provided in the flange portion 113 of the slinger 111 in the rotating side, it is impossible to previously specify what position the thread groove 114 circumferentially stops when the rotation stops. As a result, there is left a possibility of generation of the state in which the circumferentially partial thread groove 114 is arranged below the liquid surface water level H and is immersed by the sealed fluid. On the other hand, in the sealing device according to the aspect mentioned above, the thread groove is provided in the seal lip in the stationary side (the non-rotating side) in place of the rotating side, thereby doing away with the possibility of generation of the state in which the circumferentially partial thread groove 114 is arranged below the liquid surface water level H and is immersed by the sealed fluid. This structure can be exerted by always fixing the circumferential position of the thread groove.

Further, in the sealing device according to the third aspect mentioned above, the predetermined height position at which the sealed fluid is filled within the shaft hole when the rotation of the rotating shaft stops may be the same or approximately the same as the height position of the center axis of the rotating shaft. In this case, the thread groove is provided only circumferentially in an upper half of the facing surface of the seal lip.

According to the structure, since the thread groove is not provided in a lower half area in the facing surface of the seal lip, it is possible to suppress generation of the static leakage in the lower half area.

Fourth Aspect

A circumferential sealing surface and thread projections are formed on a facing surface to the seal flange in the seal lip, and a thread groove is formed between the thread projections which are adjacent to each other in a circumferential direction, the circumferential sealing surface being capable of coming into close contact with the seal flange in its entire periphery in an outer diameter end portion, and the thread projections extending in a centripetal direction in relation to an opposite direction to the rotation of the seal flange in an inner diameter side of the circumferential sealing surface.

According to the sealing device of the aspect mentioned above, since the thread projections formed in the seal lip bring about a thread pumping action feeding the fluid existing in the thread groove between the thread projections which are adjacent to each other in the circumferential direction to the circumferential sealing surface in the outer diameter side on the basis of the rotation of the seal flange, it is possible to secure an excellent sealing performance. Further, since a dynamic pressure generated by the thread pumping action acts so as to open a portion between the circumferential sealing surface and the seal flange from an inner diameter side, a sliding surface pressure is reduced. As a result, a sliding torque of the sliding portion can be reduced. Further, in a state in which the seal flange stops, the dynamic pressure exerted by the thread pumping action is lost, and the circumferential sealing surface comes into close contact in its entire periphery with the seal flange. As a result, it is possible to effectively prevent the leakage at a time of stopping.

Further, in the sealing device according to the fourth aspect mentioned above, a width of a relative groove portion between the thread projections which are adjacent in the circumferential direction may be narrowed toward an outer diameter side.

According to the structure, since the width of the groove portion is narrowed in the course of the fluid existing in the relative groove between the thread projections which are adjacent to each other in the circumferential direction being fed to the outer diameter side on the basis of the thread pumping action, it is possible to obtain a further remarkable dynamic pressure.

Effect of the Invention

According to the present invention, in the sealing device having the seal flange and the seal lip which slidably comes into contact with the seal flange, it is possible to inhibit the static leakage from being generated when the rotation of the rotating shaft stops.

BRIEF EXPLANATION OF THE DRAWINGS

FIGS. 13A and 13B are views showing a conventional example, in which FIG. 13A is a cross sectional view of a substantial part of a sealing device according to the conventional example, and FIG. 13B is an explanatory view of a thread groove which is provided in the sealing device.

DETAILED DESCRIPTION OF PREFERRED EMBODIMENTS

Next, a description will be given of embodiments according to the present invention with reference to the accompanying drawings.

First Embodiment

Figure 1:
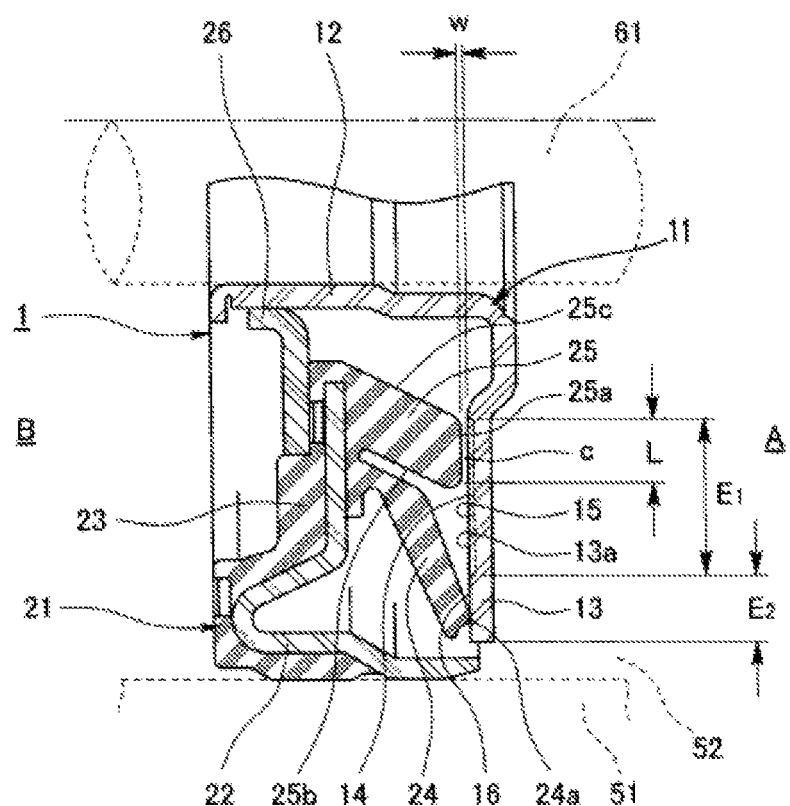
FIG. 1 is a cross sectional view of a substantial part of a sealing device according to a first embodiment of the present invention.

FIG. 1 shows a cross section of a substantial part of a sealing device 1 according to a first embodiment of the present invention.

The sealing device 1 according to the embodiment is a sealing device (an oil seal for an engine) 1 sealing so as to prevent a sealed fluid (an oil) in a machine inner side (an oil side) A from leaking to a machine outer side (an atmospheric side) B between a housing (a seal housing) 51 and a rotating shaft 61 passing through a shaft hole 52 which is provided in the housing 51, and is constructed by combination of a slinger 11 which is installed to an outer periphery of a rotating shaft 61, and a lip seal member 21 which is installed to an inner periphery of the shaft hole 52 of the housing 51.

Figure 2:
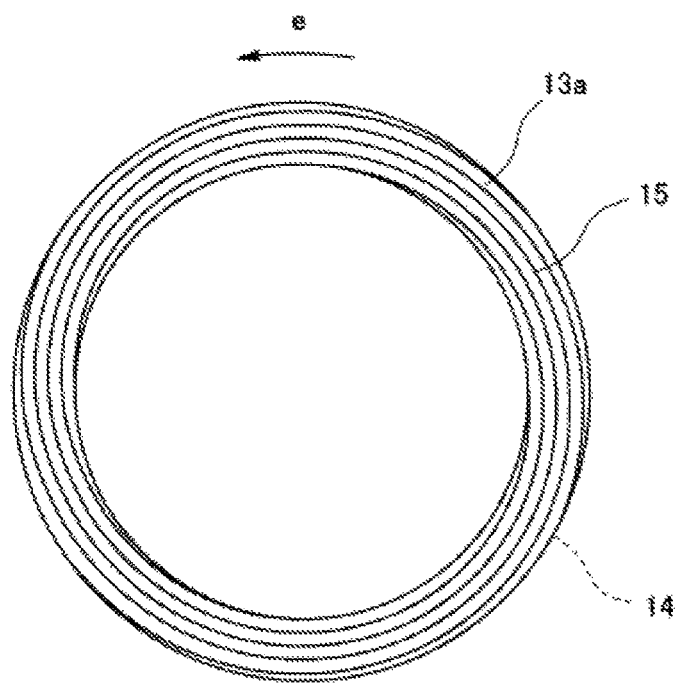
FIG. 2 is an explanatory view of a thread groove which is provided in the sealing device.

The slinger 11 is made of a rigid material such as metal, integrally has a sleeve portion 12 which is fixed (fitted) to an outer peripheral surface of the rotating shaft 61, and a flange portion (a seal flange) 13 which is provided in one end (a machine inner side end portion) of the sleeve portion 12, is provided in a machine outer side end face 13a of the flange portion 13 with an annular thread groove forming area 14, and is provided in the thread groove forming area 14 with a thread groove 15 which exerts an action of pushing back a sealed fluid toward an outer peripheral side (the machine inner side A) by exerting a fluid pumping action caused by a centrifugal force when the rotating shaft 61 rotates, as shown in FIG. 2. An arrow e denotes a rotating direction of the rotating shaft 61. The thread groove 15 in FIG. 2 is shown as a four-threaded screw.

Further, an annular thread groove non-forming area 16 where any thread groove is not formed is provided in an outer peripheral side of the thread groove forming area 14 in the machine outer side end face 13a of the flange portion 13 in the same manner. The thread groove non-forming area 16 is provided as a flat surface which is axially vertical since the thread groove is not formed.

In FIG. 1, the thread groove forming area 14 is set in a range shown by E1, and the thread groove non-forming area 16 is set in a range shown by E2.

Meanwhile, the lip seal member 21 has an attachment ring 22 which is fixed (fitted) to an inner peripheral surface of the shaft hole 52 of the housing 51 and is made of a rigid material such as metal, and a rubber-like elastic body 23 which is attached (adhered in a crosslinking manner) to the attachment ring 22, is integrally provided with a seal lip (an end face lip) 24 which slidably comes into close contact with the thread groove non-forming area 16 of the machine outer side end face 13a of the flange portion 13 in the slinger 11, and an annular projection 25 by the rubber-like elastic body 23, and is structured such that a dust lip 26 slidably coming into close contact with an outer peripheral surface of the sleeve portion 12 in the slinger 11 is assembled in the rubber-like elastic body 23.

The projection 25 is provided in an inner peripheral side of the seal lip 24, is provided so as to be directed to the flange portion 13 in the slinger 11 from its base end toward a leading end, and forms an annular micro gap c having a predetermined width (a width in an axial direction) w between the projection 25 and the flange portion 13.

Further, since the projection 25 is provided so as to be directed to the thread groove forming area 14 of the machine outer side end face 13a of the flange portion 13 in the slinger 11, the annular micro gap c having the predetermined width (the width in the axial direction) w is formed between the projection 25 and the thread groove forming area 14.

Further, since the projection 25 is provided with a leading end face 25a which is formed into an axially perpendicular flat surface, the micro gap c has the predetermined width (the width in the axial direction) w, and also has a length (a length in an axially perpendicular direction (a diametrical direction)) L which is greater than the width w.

Further, the projection 25 has the leading end face 25a which is formed into the axially perpendicular flat surface, and also has an outer peripheral surface 25b and an inner peripheral surface 25c which are formed into a taper surface shape which is inclined in a direction enlarging little by little from a base end toward a leading end. Therefore, the projection 25 is formed as a whole into a parallelogram in a cross section.

In the sealing device 1 having the structure mentioned above, the thread groove non-forming area 16 is provided in the outer peripheral side of the thread groove forming area 14 of the machine outer side end face 13a of the flange portion 13 in the slinger 11, and the seal lip 24 comes into contact with the latter thread groove non-forming area 16 in place of the former thread groove forming area 14. As a result, the lip end 24a of the seal lip 24 and the thread groove 15 do not intersect each other. Therefore, since the thread groove 15 does not form a leakage flow path of the static leakage, it is possible to inhibit the static leakage from being generated through the thread groove 15.

Further, when the rotating shaft 61 rotates, the sealing action can be exerted by the sliding motion of the seal lip 24 in relation to the thread groove non-forming area 16, the flange portion 13 exerts a fluid shake-off action in conjunction with the rotation, the thread groove 15 exerts a fluid pumping action in conjunction with the rotation, and the micro gap c exerts a non-contact type labyrinth sealing action. Therefore, it is possible to inhibit the sealed fluid from leaking to the machine outer side B on the basis of each of the actions.

Further, in addition, since the projection 25 forms the micro gap c between the projection 25 and the thread groove forming area 14 in the machine outer side end face 13a of the flange portion 13 in the sealing device 1 having the structure mentioned above, the thread groove 15 exerts the fluid pumping action in conjunction with the rotation in the inner portion of the micro gap c, and the fluid pumping action covers an entire width w thereof since the width w of the micro gap c is narrow. Accordingly, since the sealed fluid leaking through the lip end sliding portion of the seal lip 24 can leak to the machine outer side B only after passing through the micro gap c, and the fluid pumping action necessarily covers the sealed fluid entering into the micro gap c, the sealed fluid is hard to pass through the micro gap c and can hardly pass through the micro gap c. As a result, it is possible to almost completely inhibit the sealed fluid leaking through the seal lip 24 from passing through the micro gap c and leaking to the machine outer side B.

As mentioned above, according to the sealing device 1 of the embodiment, it is possible to achieve an excellent sealing performance in relation to the sealed fluid.

Second Embodiment

Figure 3:
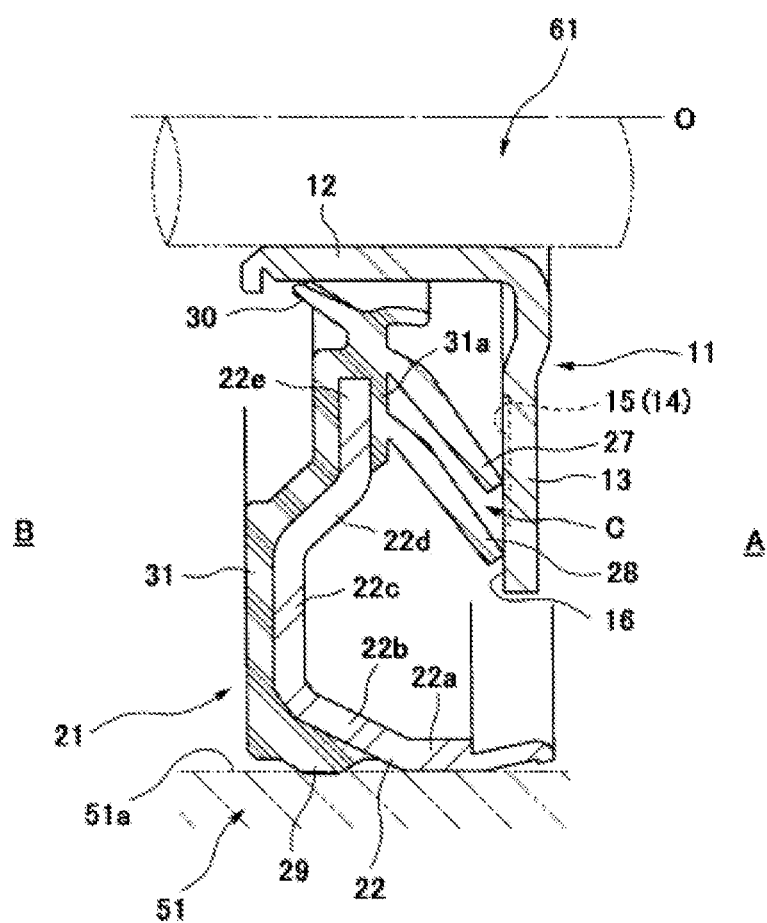
FIG. 3 is a cross sectional view of a substantial part of a sealing device according to a second embodiment of the present invention.

In FIG. 3, reference numeral 51 denotes a non-rotating housing, and reference numeral 61 denotes a rotating shaft which is inserted to a shaft hole of the housing 51. A sealing device arranged between the housing 51 and the rotating shaft 61 is provided with a lip seal member 21 which is installed to the housing 51, and a slinger 11 which is installed to the rotating shaft 61, and is structured such as to prevent an oil to be sealed existing in a machine internal space A in a right side in FIG. 3 from leaking to a machine external space B in FIG. 3 from an inner periphery of the housing 51.

The lip seal member 21 is constructed by an attachment ring 22 which is fitted and attached by pressure insertion into an inner peripheral surface of the housing 51, and an inner peripheral side seal lip 27, an outer peripheral side seal lip 28, a gasket portion 29, a dust lip 30 and an elastic layer 31 which are integrally formed in the attachment ring 22 by a rubber-like elastic material (a rubber material or a synthetic resin material having a rubber-like elasticity).

The attachment ring 22 and the slinger 11 in the lip seal member 21 are manufactured by press molding a metal plate such as a steel plate, and the attachment ring 22 among them is constructed by an outer peripheral fitting portion 22a which is fitted by pressure insertion into an inner peripheral surface 51a of the housing 51, a gasket support portion 22b which is formed into a conical tube reducing its diameter toward an opposite side to a machine internal space A from the outer peripheral fitting portion 22a, a diametrical portion 22c which extends to an inner diameter side from the gasket support portion 22b, a conical tube portion 22d which extends to the machine internal space A side from an inner diameter end portion of the diametrical portion 22c so as to reduce its diameter little by little, and a flange portion 22e which extends to an inner diameter side from an end portion of the conical tube portion 22d. Further, the slinger 11 is constructed by a sleeve portion 12 which is close fitted to an outer peripheral surface of the rotating shaft 61 and extends from one end of the sleeve portion 12.

The inner peripheral side seal lip 27 and the outer peripheral side seal lip 28 in the lip seal member 21 extend to the machine internal space A side while forming a conical tube shape each of which is formed so that a leading end is directed to an outer peripheral side from a base which is an inner diameter portion of an elastic layer 31 positioned in an inner diameter end of the flange portion 22e in the attachment ring 22, and the leading end portion is slidably brought into close contact with an end face which faces to an opposite side to the machine internal space A in the seal flange 13 and is formed into a flat surface approximately orthogonal to an axis O. Further, a repulsive force (a surface pressure against the seal flange 13) of the outer peripheral side seal lip 28 generated by being pressed to the seal flange 13 is lower than a repulsive force of the inner peripheral side seal lip 27. In the embodiment, the inner peripheral side seal lip 27 corresponds to "partial seal lip" described in claim 3, and the outer peripheral side seal lip 28 corresponds to "other seal lip".

Figure 4:
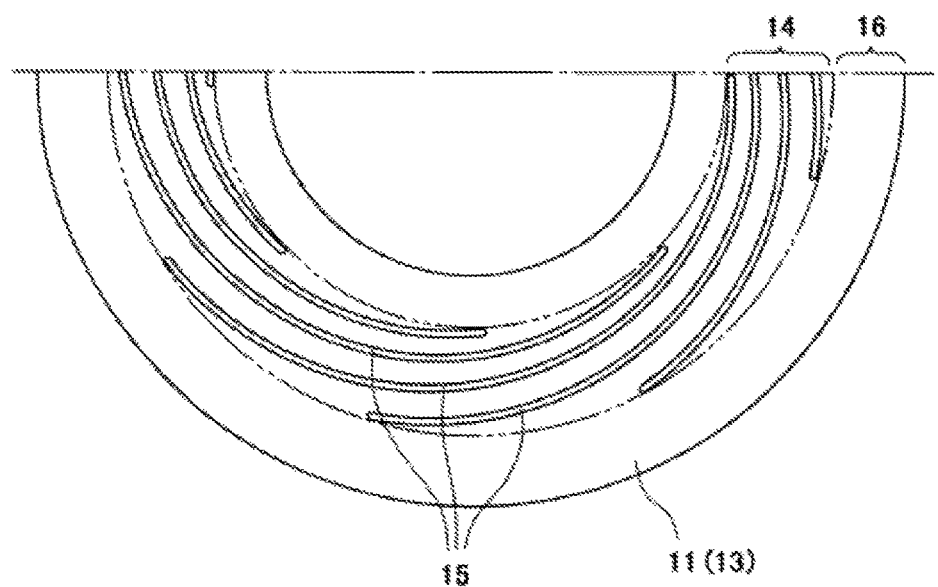
FIG. 4 is an explanatory view of a thread groove which is provided in the sealing device.

A thread groove 15 is formed in a halfway portion in a diametrical direction in the end face of the seal flange 13 of the slinger 11, and the thread groove 15 extends in a centripetal direction in relation to a shaft rotating direction (a counterclockwise direction in FIG. 4) as shown in FIG. 4. Further, the leading end portion of the inner peripheral side seal lip 27 in the lip seal member 21 is brought into close contact with a forming area (a thread groove forming area) 14 of the thread groove 15 in the end face, and the leading end portion of the outer peripheral side seal lip 28 is brought into close contact with a thread groove non-forming area 16 closer to an outer diameter side than the thread groove forming area 14 in the end face.

The gasket portion 29 in the lip seal member 21 is formed in an outer diameter end of the elastic layer 31, is positioned in an outer periphery of the gasket support portion 22b in the attachment ring 22, and retains an airtightness between the gasket portion 29 and the housing 51 by being interposed between the gasket support portion 22b and the inner peripheral surface 51a of the housing 51 with a predetermined collapsing margin.

The dust lip 30 in the lip seal member 21 extends from an inner diameter end of the elastic layer 31 to the machine external space B side while forming a conical tube, and a leading end portion thereof is close to and faced to an outer peripheral surface of the rotating shaft 61.

In the sealing device structured as mentioned above, the lip seal member 21 is fitted and attached by pressure insertion into the inner peripheral surface 51a of the housing 51 in the outer peripheral fitting portion 22a of the attachment ring 22, and is close fitted in the gasket portion 29 with an appropriate collapsing margin, and the inner peripheral side seal lip 27 and the outer peripheral side seal lip 28 of the lip seal member 21 come into close contact and slide with the end face of the seal flange 13 of the slinger 11 which integrally rotates together with the rotating shaft 61, as shown in FIG. 3, thereby inhibiting the oil to be sealed which exists in the machine internal space A side from leaking to the machine external space B side.

Particularly when the rotating shaft 61 rotates, the seal flange 13 of the slinger 11 has an action of shaking the fluid coming into contact with the seal flange 13 in an outer diameter direction on the basis of a centrifugal force, and the thread groove 15 brings about a thread pumping action feeding out the fluid to the outer diameter side on the basis of the rotation in the sliding portion between the inner peripheral side seal lip 27 and the seal flange 13 even if a part of the oil to be sealed which exists in the machine internal space A side is going to further pass through the sliding portion between the inner peripheral side seal lip 27 and the seal flange 13 to the inner diameter side from the sliding portion between the outer peripheral side seal lip 28 and the seal flange 13. As a result, an excellent sealing function can be exerted. Further, since the outer peripheral side seal lip 28 is lower repulsive than the inner peripheral side seal lip 27, an increase of friction can be suppressed by the provision of the outer peripheral side seal lip 28.

Further, since an internal pressure in an annular space C defined between the inner peripheral side seal lip 27 and the outer peripheral side seal lip 28 is raised by the thread pumping action mentioned above, the sealing performance in the sliding portion between the outer peripheral side seal lip 28 and the seal flange 13 is improved.

Further, in the case that the rotation of the rotating shaft 61 stops, the shake-off action generated by the seal flange 13 of the slinger 11 and the thread pumping action of the thread groove 15 are lost, however, since the leading end portion of the outer peripheral side seal lip 28 is brought into close contact with the thread groove non-forming area 16 which is closer to the outer diameter side than the forming area 14 of the thread groove 15 in the end face of the seal flange 13, the leakage path is not formed by the thread groove 15. Therefore, the excellent sealing performance can be maintained even when the rotating shaft 6 stops, or even under a condition that the oil to be sealed exists in the machine internal space A.

In the embodiment mentioned above, the leading end portion of the inner peripheral side seal lip 27 is brought into close contact with the forming area 14 of the thread groove 15, and the leading end portion of the outer peripheral side seal lip 28 is brought into close contact with the thread groove non-forming area 16, however, contrary to this, the leading end of the outer peripheral side seal lip 28 may be brought into close contact with the thread groove forming area, and the leading end portion of the inner peripheral side seal lip 27 may be brought into close contact with the thread groove non-forming area which is closer to the inner diameter side than the thread groove forming area.

Further, the present invention can be applied to the structure having three or more seal lips.

Third Embodiment

Figure 5:
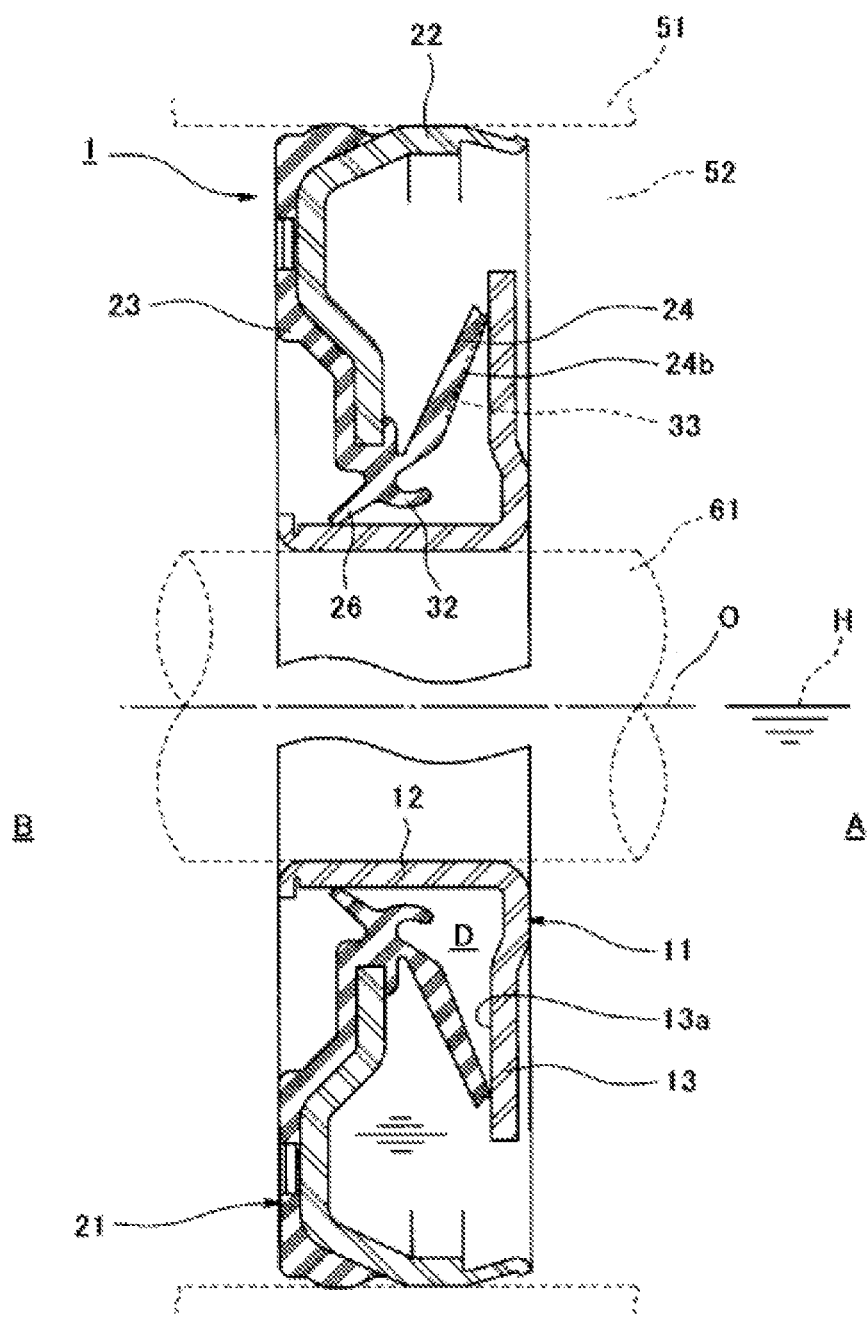
FIG. 5 is a cross sectional view of a substantial part of a sealing device according to a third embodiment of the present invention.

FIG. 5 shows a cross section of a substantial part of a sealing device 1 according to a third embodiment of the present invention.

The sealing device 1 according to the embodiment is a sealing device (an oil seal for an engine) 1 sealing so as to prevent a sealed fluid (an oil) in a machine inner side (an oil side) A from leaking to a machine outer side (an atmospheric side) B between a housing (a seal housing) 51 and a rotating shaft 61 which is inserted to a shaft hole 52 provided in the housing 51. As illustrated, the shaft hole 52 and the rotating shaft 61 are set so that their center axis O is directed to a horizontal direction. Further, it is assumed that when the rotation of the rotating shaft 61 stops, the sealed fluid is filled to a predetermined height position within the shaft hole 52, more specifically filled to a height position which is equal to or approximately equal to a height position of the center axis O of the rotating shaft 61. In the drawing, a liquid surface water level at this time is denoted by reference symbol H.

The sealing device 1 is constructed by a combination of a slinger 11 which is installed to an outer periphery of the rotating shaft 61, and a lip seal member 21 which is installed to an inner periphery of the shaft hole 52 of the housing 51.

The slinger 11 is made of a rigid material such as metal, and integrally has a sleeve portion 12 which is fixed (fitted) to an outer peripheral surface of the rotating shaft 61, and a flange portion (a seal flange) 13 which is provided in one end (a machine inner side end portion) of the sleeve portion 12. Any thread groove is not provided in a machine outer side end face 13a of the flange portion 13, and the machine outer side end face 13a of the flange portion 13 is accordingly formed into a smooth surface.

Meanwhile, the lip seal member 21 has an attachment ring 22 which is fixed (fitted) to an inner peripheral surface of the shaft hole 52 of the housing 51 and is made of a rigid material such as metal, and a rubber-like elastic body 23 which is attached (adhered in a crosslinking manner) to the attachment ring 22, and is integrally provided with a seal lip (an end face lip) 24 which slidably comes into close contact with the machine outer side end face 13a of the flange portion 13 in the slinger 11, an oil recovery lip 32 which does not come into contact with the slinger 11, and a dust lip 26 which slidably comes into close contact with an outer peripheral surface of the sleeve portion 12 in the slinger 11, by the rubber-like elastic body 23. The oil recovery lip 32 is arranged in a machine outer side B of the seal lip 24, and the dust lip 26 is arranged further in the machine outer side B of the oil recovery lip 32.

A facing surface 24b of the seal lip 24 facing to the machine outer side end face 13a of the flange portion 13 is provided with a thread groove 33 which exerts an action of pushing back the sealed fluid toward an outer peripheral side (a machine inner side A) by exerting a pumping action caused by a centrifugal force when the rotating shaft 61 rotates. Since the seal lip 24 is formed into a tapered (funnel-like) side lip which is enlarged its diameter little by little from a base end portion to a leading end portion, the thread groove 33 is provided in an inner peripheral surface of the seal lip 24.

Figure 6:
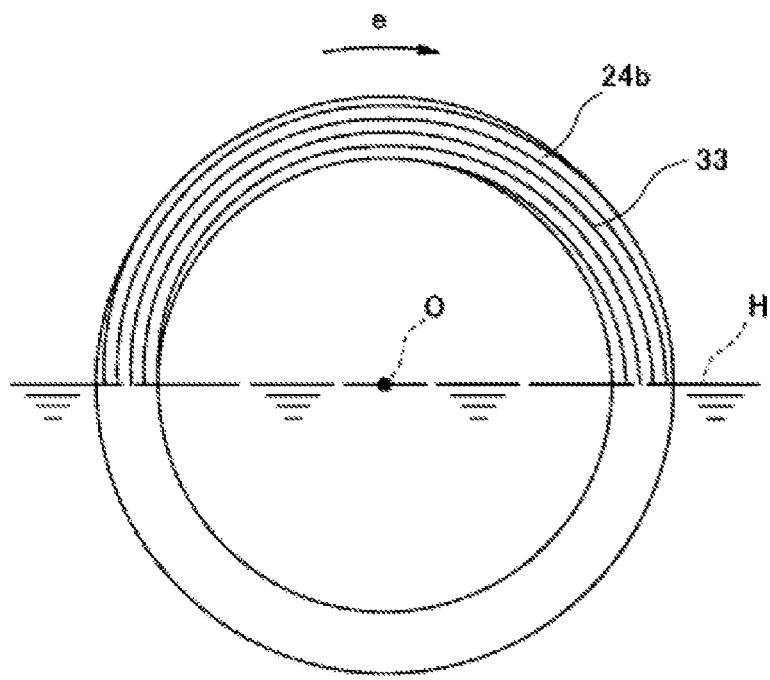
FIG. 6 is an explanatory view of a thread groove which is provided in the sealing device.

Further, the thread groove 33 is provided only at a position which is above a predetermined height position where the sealed fluid is filled within the shaft hole 52 when the rotation of the rotating shaft 61 stops, in the facing surface 24b of the seal lip 24, as shown in FIG. 6, and the sealed fluid is filled in the embodiment to the height position which is equal to or approximately equal to the height position of the center axis O of the rotating shaft 61 as mentioned above. Therefore, the thread groove 33 is provided only in an upper half region among the facing surface 24b of the seal lip 24.

Figure 7:
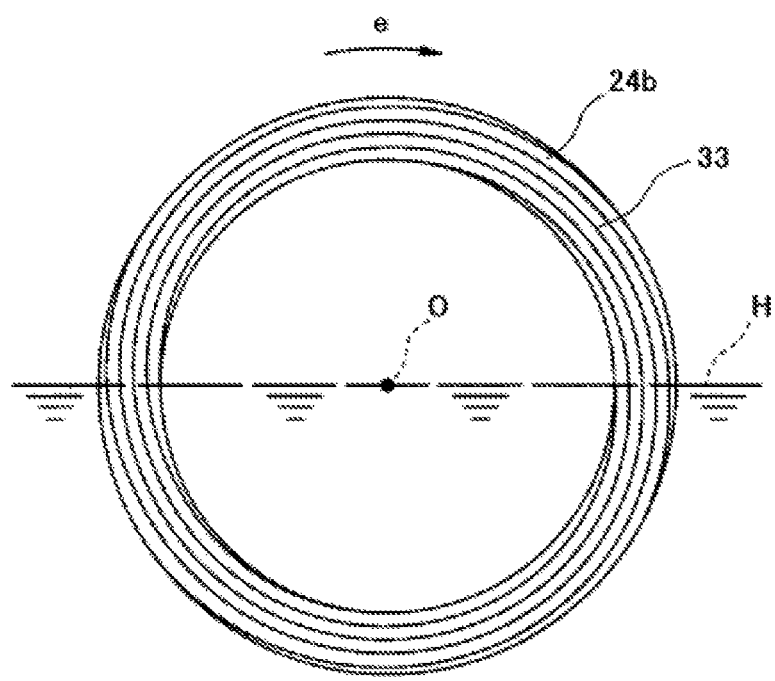
FIG. 7 is an explanatory view of a thread groove according to a comparative example.

More specifically, if the thread groove 33 is provided over an entire periphery 360 degrees as shown in FIG. 7 showing a comparative example, the thread groove 33 is arranged below the liquid surface water level H in a circumferentially lower half region and is in a state in which the thread groove 33 is immersed into the sealed fluid. As a result, the sealed fluid tends to enter into the inner peripheral side of the seal lip 24 from the outer peripheral side of the seal lip 24 via the thread groove 33 in the circumferentially lower half region. On the contrary, in the embodiment, since the thread groove 33 is provided only in the circumferentially upper half region and is not provided in the lower half region as shown in FIG. 6, the thread groove 33 is structured such as to be prevented from being arranged below the liquid surface water level H and being immersed into the sealed fluid.

In FIGS. 6 and 7, an arrow e denotes a rotating direction of the rotating shaft 61. The thread groove 33 is shown as a four-threaded screw in FIG. 6.

In the sealing device 1 having the structure mentioned above, the basic sealing function can be exerted by the seal lip 24 slidably coming into close contact with the flange portion 13 of the slinger 11 when the rotating shaft 61 rotates, the slinger 11 rotating together with the rotating shaft 61 exerts the fluid shake-off action caused by the flange portion 13, and the thread groove 33 provided in the seal lip 24 further exerts the fluid pumping action in conjunction with the relative rotation to the flange portion 13. As a result, it is possible to return the fluid to the outer peripheral side (the machine inner side A) even if the fluid passes through between the seal lip 24 and the flange portion 13, whereby an excellent sealing function can be exerted.

Further, when the rotation of the rotating shaft 61 stops, the centrifugal force disappears, and the fluid shake-off action and the fluid pumping action temporarily stop in conjunction with the disappearance. Accordingly, there is fear that the partial sealed fluid flows out to a space D between the seal lip 24 and the oil recovery lip 32 from the machine inner side A through the thread groove 33. However, in the present embodiment, since the thread groove 33 is provided only at the position which is above the predetermined height position where the sealed fluid is filled within the shaft hole 52 when the rotation of the rotating shaft 61 stops in the facing surface 24b of the seal lip 24 as mentioned above, there is not generated a state in which the circumferential partial thread groove 33 is arranged below the liquid surface water level H and is immersed into the sealed fluid. Therefore, it is possible to suppress the static leakage of the sealed fluid from the outer peripheral side of the seal lip 24 to the inner peripheral side through the thread groove 33.

The predetermined height position where the sealed fluid is filled within the shaft hole 52 when the rotation of the rotating shaft 61 stops is set to the height position which is equal to or approximately equal to the height position of the center axis O of the rotating shaft 61 as mentioned above as a specific example, however, is not limited to this in the present invention, but can be set, for example, to a height position which is equal to or approximately equal to a height position of a lower end portion of the rotating shaft 61, as the other example. The lower end portion of the rotating shaft 61 is here a circumferentially lower end portion on the outer peripheral surface of the rotating shaft 61 which is set by directing the center axis O to the horizontal direction. Further, in this case, since a region which forms the thread groove 33 is increased and a region which does not form the thread groove 33 is decreased in the facing surface 24b of the seal lip 24 in comparison with the embodiment mentioned above, it is possible to enhance the fluid pumping action generated by the thread groove 33.

Fourth Embodiment

Figure 8:
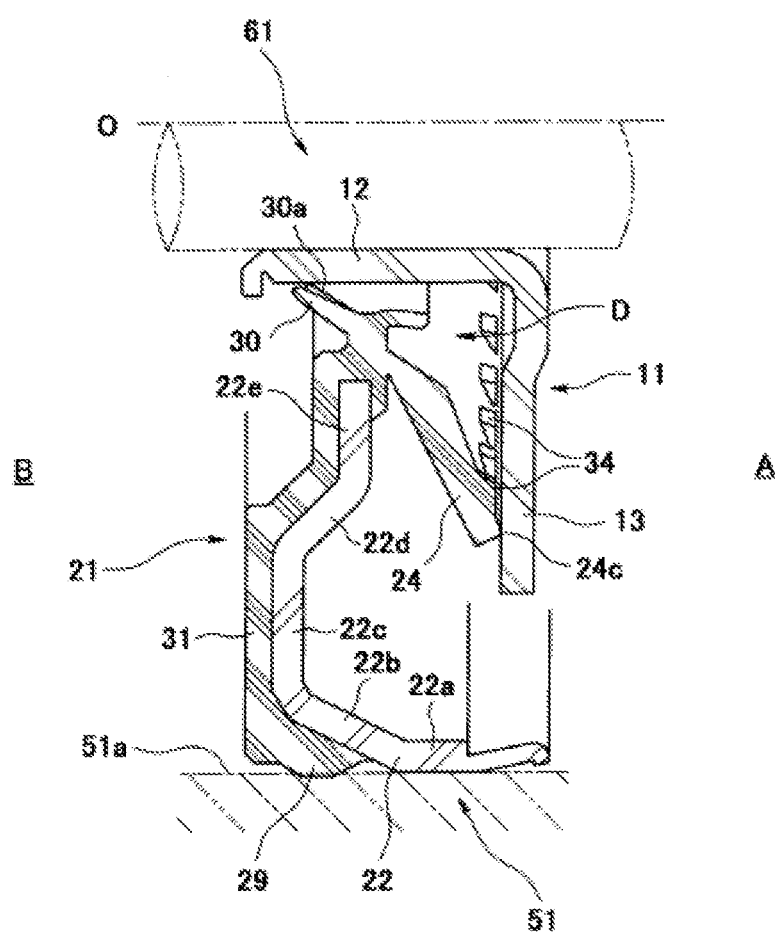
FIG. 8 is a cross sectional view of a substantial part of a sealing device according to a fourth embodiment of the present invention.

In FIG. 8, reference numeral 51 denotes a non-rotating housing, and reference numeral 61 denotes a rotating shaft which is inserted to a shaft hole of the housing 51. A sealing device arranged between the housing 51 and the rotating shaft 61 has an end face lip type seal structure, is provided with a lip seal member 21 which is installed to the housing 51, and a slinger 11 which is installed to the rotating shaft 61, and is structured such as to prevent a sealed fluid (an oil) existing in a machine internal space A in a right side in FIG. 8 from leaking to a machine external space B in FIG. 8 from an inner periphery of the housing 51.

The lip seal member 21 is constructed by an attachment ring 22 which is fitted and attached by pressure insertion into an inner peripheral surface of the housing 51, and a seal lip 24, a gasket portion 29, a dust lip 30 and an elastic layer 31 which are integrally formed in the attachment ring 22 by a rubber-like elastic material (a rubber material or a synthetic resin material having a rubber-like elasticity).

The attachment ring 22 in the lip seal member 21, and the slinger 11 are manufactured by press molding a metal plate such as a steel plate, and the attachment ring 22 among them is constructed by an outer peripheral fitting portion 22a which is fitted by pressure insertion into an inner peripheral surface 51a of the housing 51, a gasket support portion 22b which is formed into a conical tube reducing its diameter toward an opposite side to a machine internal space A from the outer peripheral fitting portion 22a, a diametrical portion 22c which extends to an inner diameter side from the gasket support portion 22b, a conical tube portion 22d which extends to the machine internal space A side from an inner diameter end portion of the diametrical portion 22c so as to reduce its diameter little by little, and a flange portion 22e which extends to an inner diameter side from an end portion of the conical tube portion 22d. Further, the slinger 11 is constructed by a sleeve portion 12 which is close fitted to an outer peripheral surface of the rotating shaft 61 and the seal flange 13 which extends from one end of the sleeve portion 12.

The seal lip 24 in the lip seal member 21 is extending to the machine internal space A side while forming a conical tube shape which is formed so that a leading end is directed to an outer peripheral side from a base which is an inner diameter portion of an elastic layer 31 positioned in an inner diameter end of the flange portion 22e in the attachment ring 22.

Figure 9:
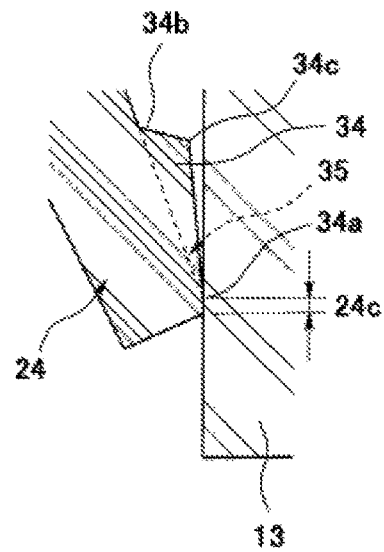
FIG. 9 is an enlarged cross sectional view of a substantial part in FIG. 8.
Figure 10:
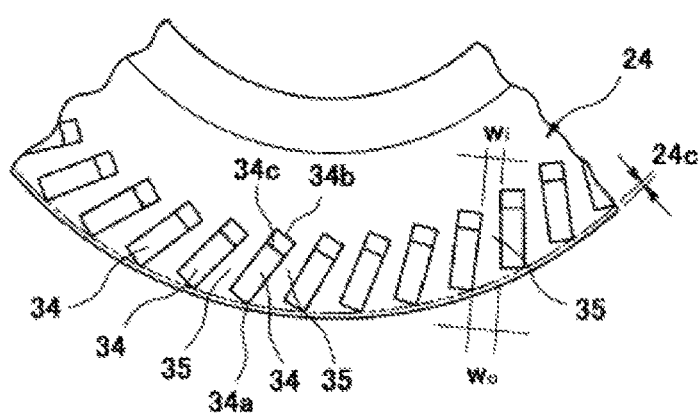
FIG. 10 is a view of an example of a shape of a thread projection as seen from a direction which is parallel to an axis.

An outer diameter end portion of the facing surface to the seal flange 13 in the seal lip 24 is formed into a circumferential sealing surface 24c which is formed flat in its entire periphery and can come into close contact with the seal flange 13, as shown in FIGS. 9 and 10, and a lot of thread projections 34 are formed uniformly in a circumferential direction in an inner diameter side of the circumferential sealing surface 24c.

Each of the thread projections 34 extends in a centripetal direction in relation to an opposite direction (a counterclockwise direction in FIG. 10) to the rotation of the seal flange 13, reaches the circumferential sealing surface 24c in its outer diameter end portion 34a, and brings about a thread pumping action of feeding the fluid existing in the relative thread groove 35 between the circumferentially adjoin thread projections 34 and 34 to the circumferential sealing surface 24c when the seal flange 13 rotates in a clockwise direction in FIG. 10. Further, the thread projection 34 is formed into a bulge shape in which a top portion 34c is unevenly distributed in an inner diameter end portion 34b side, and is formed at a bulge height which does not prevent close contact of the circumferential sealing surface 24c with the seal flange 13.

Turning the description back to FIG. 8, the gasket portion 29 in the lip seal member 21 is formed in an outer diameter end of the elastic layer 31, is positioned in an outer periphery of the gasket support portion 22b in the attachment ring 22, and is interposed between the gasket support portion 22b and the inner peripheral surface 51a of the housing 51 with a predetermined collapsing margin, thereby retaining the airtightness between the gasket portion 29 and the housing 51.

The dust lip 30 in the lip seal member 21 extends from an inner diameter end of the elastic layer 31 to the machine external space B side while forming a conical tube, and comes close to and faces to an outer peripheral surface of the rotating shaft 61 in its leading end portion. Further, a plurality of ribs 30a are formed at predetermined intervals in a circumferential direction on an inner peripheral surface of the dust lip 30, the ribs 30a supporting in a state in which a leading end portion of the dust lip 30 floats slightly up from an outer peripheral surface of the rotating shaft 61, thereby preventing the inner peripheral space D of the seal lip 24 from becoming negative pressure due to the shake-off action of the seal flange 13 in the slinger 11 and the thread pumping action of the thread projection 34 in the seal lip 24.

In the sealing device according to the embodiment having the structure mentioned above, the lip seal member 21 is close fitted in the gasket portion 29 with the appropriate collapsing margin, as well as being fitted and attached by pressure insertion into the inner peripheral surface 51a of the housing 51 in the outer peripheral fitting portion 22a of the attachment ring 22, and the circumferential sealing surface 24c of the seal lip 24 in the lip seal member 21 comes into slidable contact with the end face of the seal flange 13 in the slinger 11 integrally rotating with the rotating shaft 61, as shown in FIG. 8, thereby inhibiting the sealed fluid (the oil) existing in the machine internal space A side from leaking to the machine external space B side.

Particularly when the rotating shaft 61 rotates, there is generated the thread pumping action that the fluid (the air) existing in the relative groove portion (the thread groove) 35 between the circumferentially adjacent thread projections 34 and 34 is guided to the outer diameter side by the thread projections 34 so that the fluid is going to flow in a clockwise direction in FIG. 10 so as to be dragged to the seal flange 13, in the inner diameter side of the circumferential sealing surface 24c of the seal lip 24 which is brought into close contact with the seal flange 13, in addition to the matter that the seal flange 13 of the slinger 11 rotating integrally with the rotating shaft 61 has the action of shaking off the fluid coming into contact with the seal flange 13 in the outer diameter direction on the basis of the centrifugal force. As a result, the sealed fluid (the oil) existing in the machine internal space A side can not easily enter into the inner diameter side from the outer diameter side of the circumferential sealing surface 24c, and an excellent sealing performance can be exerted.

Further, since a distance in an axial direction between the facing surfaces of the seal lip 24 and the seal flange 13 is narrowed toward an outer diameter side (a circumferential sealing surface 24c side), the fluid (the air) existing in the relative groove portion 35 between the circumferentially adjacent thread projections 34 and 34 is exposed to a compression in an axial direction in the process of being fed to the outer diameter side on the basis of the shake-off action and the thread pumping action mentioned above, and generates a dynamic pressure. Further, the sliding surface pressure is lower in this kind of end face lip type sealing device in which the seal lip 24 is brought into slidable contact with the seal flange 13 in the axial direction, in comparison with a type that the seal lip is brought into slidable contact with the outer peripheral surface of the rotating shaft, and the dynamic pressure additionally acts so as to open the portion between the circumferential sealing surface 24c of the seal lip 24 and the seal flange 13 from the inner diameter side. Therefore, the sliding surface pressure is lowered, and a sliding torque is accordingly lowered, thereby contributing to low fuel consumption.

Further, in a state in which the slinger 11 (the seal flange 13) stops due to the stop of the rotating shaft 61, the dynamic pressure caused by the shake-off action and the thread pumping action mentioned above is lost, the circumferential sealing surface 24c comes into close contact with the seal flange 13 in its entire periphery and the surface pressure of the circumferential sealing surface 24c is increased. Accordingly, the leakage path is not formed. Therefore, for example, even in the case that the axis of the rotating shaft 61 is approximately horizontal and the lower half portions of the seal lip 24 and the seal flange 13 are immersed into the sealed fluid (the oil) at a time of stopping, it is possible to effectively prevent the fluid to be sealed from entering into the inner diameter side from the outer diameter side of the circumferential sealing surface 24*c* and leaking to the machine external space B side.

Figure 11:
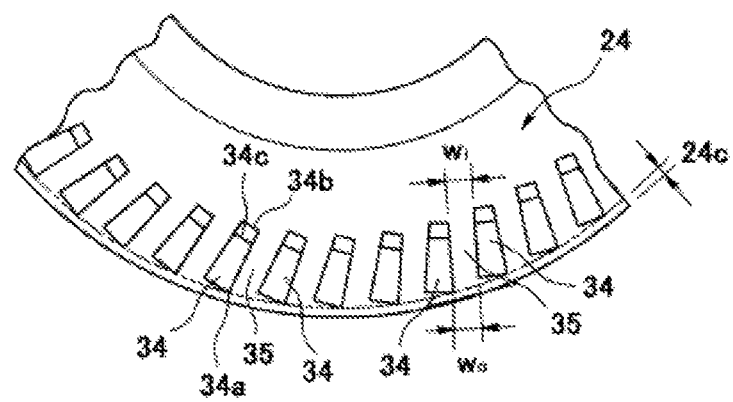
FIG. 11 is a view of the other example of the shape of the thread projection as seen from a direction which is parallel to an axis.
Figure 12:
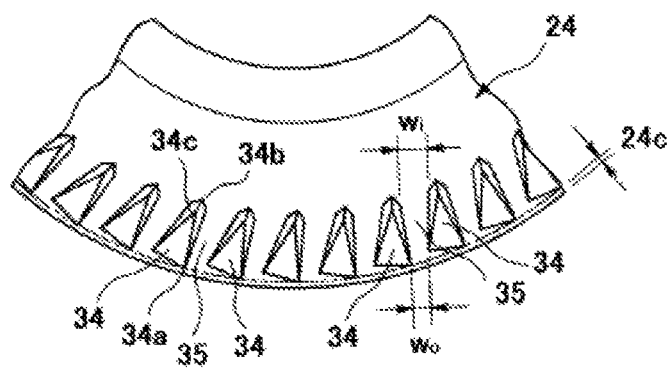
FIG. 12 is a view of the other example of the shape of the thread projection as seen from a direction which is parallel to an axis.
Figure 13A:
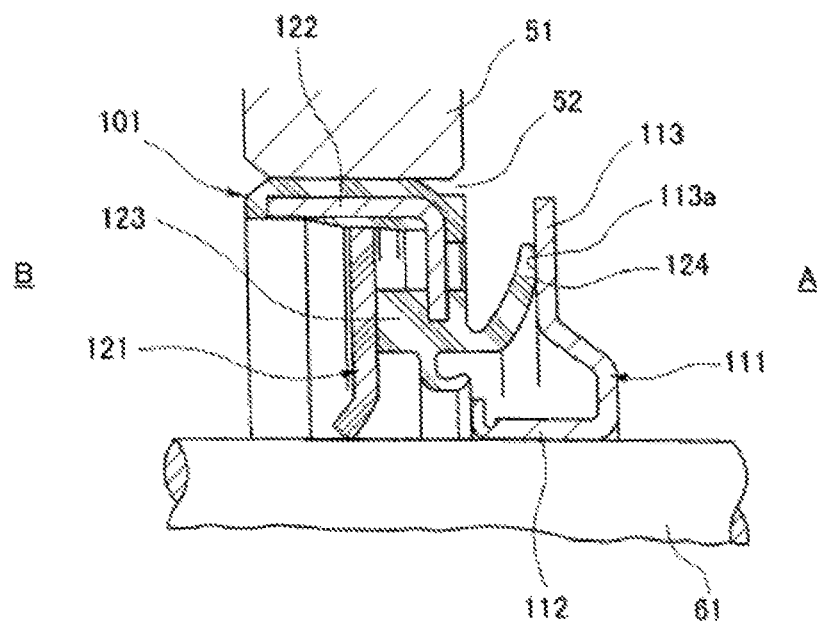
Figure 13B:
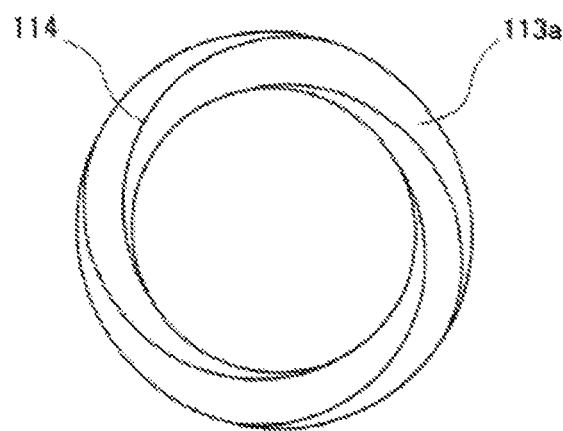

In an example shown in FIG. 10, a width of the thread projection 34 is approximately the same in an outer diameter end portion 34*a* side and an inner diameter end portion 34*b* side, and a relative groove portion 35 between the circumferentially adjoin thread projections 34 and 34 is greater in a width $w_o$ in the outer diameter end portion side than in a width $w_i$ in the inner diameter end portion side. However, an example shown in FIG. 11 is structured such that the width $w_i$ in the inner diameter end portion side of the relative groove portion 35 is set to be approximately the same as the width $w_o$ in the outer diameter end portion side, and an example shown in FIG. 12 is structured such that the width $w_o$ in the outer diameter end portion side is set to be smaller than the width $w_i$ in the inner diameter end portion side of the relative groove portion 35. As a result, in both of the example shown in FIG. 11 and the example shown in FIG. 12, the thread projection 34 is formed into a shape a width of which is increased in the outer diameter end portion 34*a* side than in the inner diameter end portion 34*b* side.

According to the structure, the dynamic pressure effect acting so as to open the portion between the circumferential sealing surface 24*c* of the seal lip 24 and the seal flange 13 from the inner diameter side at a time of rotating is improved, in comparison with the structure in which the width of the relative groove portion 35 between the thread projections 34 and 34 is enlarged toward the outer diameter end portion side such as the example shown in FIG. 10. Particularly, since the dynamic pressure effect is further improved in the structure in which the width of the relative groove portion 35 is narrowed toward the outer diameter side such as the example shown in FIG. 12, it is possible to achieve a further sliding torque reduction.

What is claimed is:

1. A sealing device sealing so as to prevent a sealed fluid in a machine inner side from leaking to a machine outer side between a housing and a rotating shaft which is inserted to a shaft hole provided in said housing, the sealing device comprising:
   a seal flange which is installed to an outer periphery of said rotating shaft;
   a seal lip which is installed to an inner periphery of the shaft hole of said housing; and
   the seal lip slidably coming into contact with the seal flange over an entire periphery,
   wherein the sealing device comprises:
   a thread groove formed in the seal flange which exerts a fluid pumping action when said rotating shaft rotates, and
   wherein said thread groove is provided at a thread groove forming area that is provided in a machine outer side end face of said seal flange by setting said thread groove in a part of the machine outer side end face of said seal flange,
   a thread groove non-forming area which is not provided with said thread groove is provided in an outer peripheral side of said thread groove forming area,
   said seal lip is slidably brought into contact with said thread groove non-forming area over the entire periphery, and
   an annular projection is provided in an inner peripheral side of said seal lip toward said seal flange, and a micro gap is provided between said projection and said seal flange.

2. The sealing device according to claim 1, wherein said projection is structured such that said micro gap is formed between said projection and said thread groove forming area in the machine outer side end face of said seal flange.

* * * * *